(12) United States Patent
Compton

(10) Patent No.: US 10,107,320 B2
(45) Date of Patent: Oct. 23, 2018

(54) BIDIRECTIONAL MODULAR ASSEMBLY CLIP

(71) Applicant: Gregory Compton, Santa Barbara, CA (US)

(72) Inventor: Gregory Compton, Santa Barbara, CA (US)

(*) Notice: Subject to any disclaimer, the term of this patent is extended or adjusted under 35 U.S.C. 154(b) by 0 days.

(21) Appl. No.: 15/796,768

(22) Filed: Oct. 28, 2017

(65) Prior Publication Data

US 2018/0094662 A1    Apr. 5, 2018

Related U.S. Application Data

(63) Continuation of application No. 14/670,357, filed on Mar. 26, 2015, now Pat. No. 9,803,669.

(60) Provisional application No. 61/971,476, filed on Mar. 27, 2014.

(51) Int. Cl.
| | |
|---|---|
| *F16B 5/06* | (2006.01) |
| *F16B 12/10* | (2006.01) |
| *H02S 30/10* | (2014.01) |
| *F16B 7/04* | (2006.01) |
| *F16B 5/00* | (2006.01) |
| *A47B 47/00* | (2006.01) |

(52) U.S. Cl.
CPC ............ *F16B 5/065* (2013.01); *F16B 5/0084* (2013.01); *F16B 5/0092* (2013.01); *F16B 5/0614* (2013.01); *F16B 7/048* (2013.01); *F16B 7/0433* (2013.01); *F16B 12/10* (2013.01); *H02S 30/10* (2014.12); *A47B 47/0091* (2013.01); *Y10T 24/45785* (2015.01); *Y10T 29/49895* (2015.01)

(58) Field of Classification Search
CPC .... A47B 47/0091; F16B 12/10; F16B 5/0084; F16B 5/0092; F16B 5/0614; F16B 5/065; F16B 7/0433; F16B 7/048; H02S 30/10; Y10T 24/45785; Y10T 29/49895
See application file for complete search history.

(56) References Cited

U.S. PATENT DOCUMENTS

| | | | |
|---|---|---|---|
| 3,037,593 A | 6/1962 | Webster | 160/135 |
| 4,019,298 A | 4/1977 | Johnson, IV | 403/175 |
| 4,025,216 A | 5/1977 | Hives | 108/158.12 |
| 4,160,609 A | 7/1979 | Jackson | 403/309 |
| 4,646,497 A | 3/1987 | Hoenle | 403/263 |
| 5,244,300 A | 9/1993 | Perreira | 403/263 |
| 6,370,828 B1 | 4/2002 | Genschorek | 521/173.3 |
| 7,090,085 B1 | 8/2006 | Vicendese | 211/106.01 |
| 7,350,829 B2 | 4/2008 | Dyal | 285/325 |
| 8,091,847 B2 | 1/2012 | Schnitzer | 248/205.1 |
| 8,495,997 B1 | 7/2013 | Laubach | 126/680 |
| 8,894,424 B2 | 11/2014 | DuPont | 439/95 |
| 9,273,885 B2* | 3/2016 | Rodrigues | H02S 40/32 |
| 9,714,673 B2* | 7/2017 | Phillips | F16B 12/24 |
| 9,985,575 B2* | 5/2018 | Stearns | H02S 20/23 |
| 2004/0120759 A1 | 6/2004 | Altman | 403/374.3 |

(Continued)

*Primary Examiner* — David M Upchurch
(74) *Attorney, Agent, or Firm* — David R Preston

(57) ABSTRACT

The present invention includes a multiuse clip assembly which can be employed to secure objects or panels to one another. It incorporates both the male and female features into each clip for greater versatility and durability over conventional clip systems. The unique universal and expandable mating system does not limit the orientation, position, or number of objects or panels that may be secured to one another.

20 Claims, 20 Drawing Sheets

(56) References Cited

U.S. PATENT DOCUMENTS

| | | |
|---|---|---|
| 2004/0155562 A1* | 8/2004 | Saravis .............. A47B 47/0033 |
| | | 312/111 |
| 2008/0105796 A1 | 5/2008 | Nix ................................. 248/73 |
| 2008/0235919 A1 | 10/2008 | Giddings ........................ 24/289 |
| 2009/0242014 A1* | 10/2009 | Leary .................... F24J 2/5239 |
| | | 136/251 |
| 2010/0192505 A1 | 8/2010 | Schaefer ...................... 52/653.2 |
| 2010/0254757 A1 | 10/2010 | Saul ............................. 403/404 |
| 2011/0099774 A1 | 5/2011 | Pontaoe .......................... 24/457 |
| 2013/0051910 A1 | 2/2013 | Hen .............................. 403/361 |
| 2017/0055700 A1* | 3/2017 | Chung .............. A47B 47/0033 |

\* cited by examiner

BIDIRECTIONAL MODULAR ASSEMBLY CLIP

The present application is a Continuation Application of U.S. Provisional Application Ser. No.: 14/670,357, filed Mar. 26, 2015, now U.S. Pat. No. 9,803,669, issued Oct. 31, 2017; which claims priority to U.S. Provisional Application Ser. No.: 61/971,476, filed Mar. 27, 2014; each of which is incorporated by reference herein in its entirety.

TECHNICAL FIELD

The present invention relates generally to a locking clip system for securing panels or other objects together, and, more particularly, to a clip system that incorporates both the male and female snapping features into each side for greater versatility and durability over conventional clip systems.

BACKGROUND

In recent years, it has become common to ship disassembled flat panel structures from factories to the user. These structures are usually broken down into components for more efficient packing and shipping. Thereafter, they are assembled on site by the user who may be unskilled at carpentry. The user may prefer that the components fit together with minimal use of tools and specialized fittings. Further, the user may wish to assemble these systems into a custom structure to better suite his/her needs. Hence it is necessary to have a clip system to allow parts to be tightly secured to one another with minimal effort and in a way that allows for more flexibility in assembling the structure.

These traditional panel systems, such as those used to assemble knock-down furniture (cabinets and shelving, closet storage, etc.), cat furniture, trade show booths, semi-permanent indoor rooms and offices, and outdoor structures such as storage sheds and temporary shelters, are generally fixed predesigned structures assembled using a variety of tools, nails, screws, bolts, and other types of fastening such as clips and adhesives for assembly.

For example, U.S. Pat. No. 8,495,997 discloses an apparatus for attaching a solar panel to a purlin. The panels are connected in a multi-step process using a variety of specialized parts. The clips and mounts allow the panels to be attached in a single arrangement. The assembly is cumbersome and the clips have no versatility. Similarly, U.S. Pat. No. 8,894,424 discloses a solar panel assembly attachment apparatus which includes several unique pieces that must be fit together in a multi-step assembly process. These current panel systems lack true modularity in that each modular component can generally only be used in one location and in one orientation within a structure.

Common assembly clips have been developed which are composed of two compatible parts that are joined together. The user joins the "female" side with a compatible "male" side, usually by snapping or bolting them together, often with the use of a tool such as a screwdriver, or wrench. By their nature, these systems limit the way in which the structure being assembled may be put together because once the "male" assembly device has been joined to the "female" assembly device, no more parts may be assembled using those assembly devices. Accordingly, traditional clip assemblies have limitations in their functionality and use and therefore, there is a need for improvements over currently available clip assemblies.

By contrast the invention herein allows for true modular and universal assemblies because each component can be used anywhere and in any orientation where they geometrically fit within a structure. Moreover the invention allows for structures which can be expanded with more components, or disassembled and rearranged into many different structures at any time.

The present invention includes a multiuse clip assembly which can be employed to firmly secure objects or assemblies to one another with minimal effort. The unique universal and expandable panel mating system does not limit the orientation, position, or number of panels that may be secured to one another. Other advantageous features of the invention will become readily apparent depending on the user's needs.

SUMMARY

The present invention recognizes that there exists a long felt need for a clip assembly that is both sturdy and user friendly for use with, among other things, furniture and other modular structures.

A first aspect of the present invention is a clip assembly in which the male and female clip features are present on each clip. Because each clip has a male and a female feature, they may be used interchangeably and one of each type of feature from each clip body will remain available to assemble more clips after two clips have been mated.

A second aspect of the present invention is a clip assembly in which the male and female mating features are preferably located on two opposing planes symmetric about the clip body such that symmetric planes form the legs of an isosceles triangle whose included angle may be any angle as required.

A third aspect of the present invention is a clip assembly in which two additional planes internal to the clip body on the female side form a load-bearing interface, wherein the planes form the legs of an isosceles triangle whose base is formed by the plane locating the female feature.

A fourth aspect of the present invention is a clip assembly that may be used when panels are to be secured perpendicular to each other such that the planes containing the male and female features are preferably at 90° to each other and each at 45° to the internal load-bearing mating planes forming a right isosceles triangle and the internal mating feature planes form the legs of a right isosceles triangle.

A fifth aspect of the present invention is a clip assembly wherein a unique universal and expandable panel mating system does not limit the orientation, position, or number of panels, wherein clips are mounted symmetrically about the panel midline in pairs, or in any even integer, but with each symmetric clip-pair oriented opposite to each other such that panels may be universally mated together along panel edges wherein panels can be flipped along panel midlines or rotated about panel center axes and mated in any orientation as allowed by the panels' shape and size as long as the panels' edges are parallel and aligned at the panel midlines.

A sixth aspect of the present invention is a clip assembly wherein clips are mounted symmetrically about the panel midline in pairs, or in any even integer, and with each symmetric clip-pair oriented in the same way to each other such that panels may be universally mated together along panel edges and panels can be rotated about panel center axes and mated in any orientation as allowed by the panels' shape and size, provided that the panels' edges are parallel and aligned at the panel midlines.

A seventh aspect of the present invention is a clip assembly wherein clips can be mated by physically pressing or snapping the male and female features together.

An eighth aspect of the present invention is a clip assembly wherein a tool or lever may be inserted into slots at the base of the assembly and rotated so that the tool acts as a cam on the ramp features to pry open the beams of the female feature. When the beams of the female feature are pried open, individual clip assemblies are more easily mated. When the tool is released or rotated in the opposite sense and removed, the beams of the female feature once again are allowed to close.

An ninth aspect of the present invention is a clip assembly with an internal mechanical latching member to allow individual clips to be latched to one another and/or unlatched by shifting a lever.

A tenth aspect of the present invention is a clip assembly with an internal fastening feature wherein a bolt or rotational cam-style fastener allows individual clips to be secured to one another.

A eleventh aspect of the present invention is a method of using the clip assemblies of the invention to secure panels together for assembly of furniture or a structure such as a jungle gym, solar panel frame or truss, office cubicle or shelter.

BRIEF DESCRIPTION OF THE FIGURES

The drawings described herein are for illustrative purposes only of selected embodiments and not all possible implementations, and are not intended to limit the scope of the present disclosure.

which are secured perpendicular to one another with mated clips. The arrangement of the individual clips is also depicted.

Figure 24:
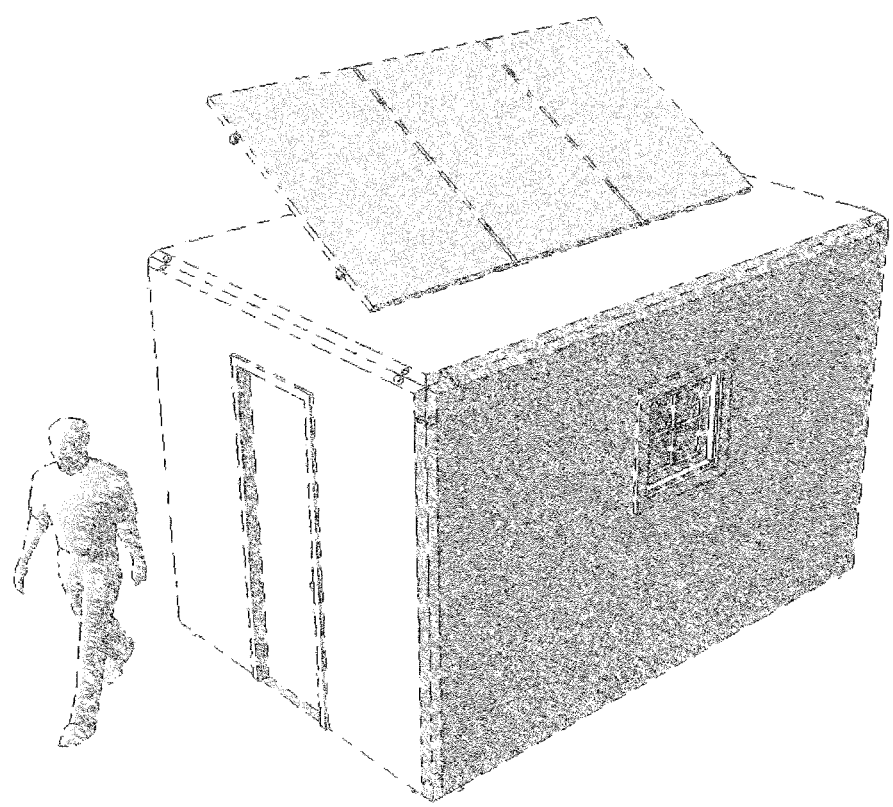

FIG. 24 generally depicts one aspect of the present invention, a perspective view demonstrating the use of clips to attach panels and other objects to form a shelter or structure.

Figure 25:
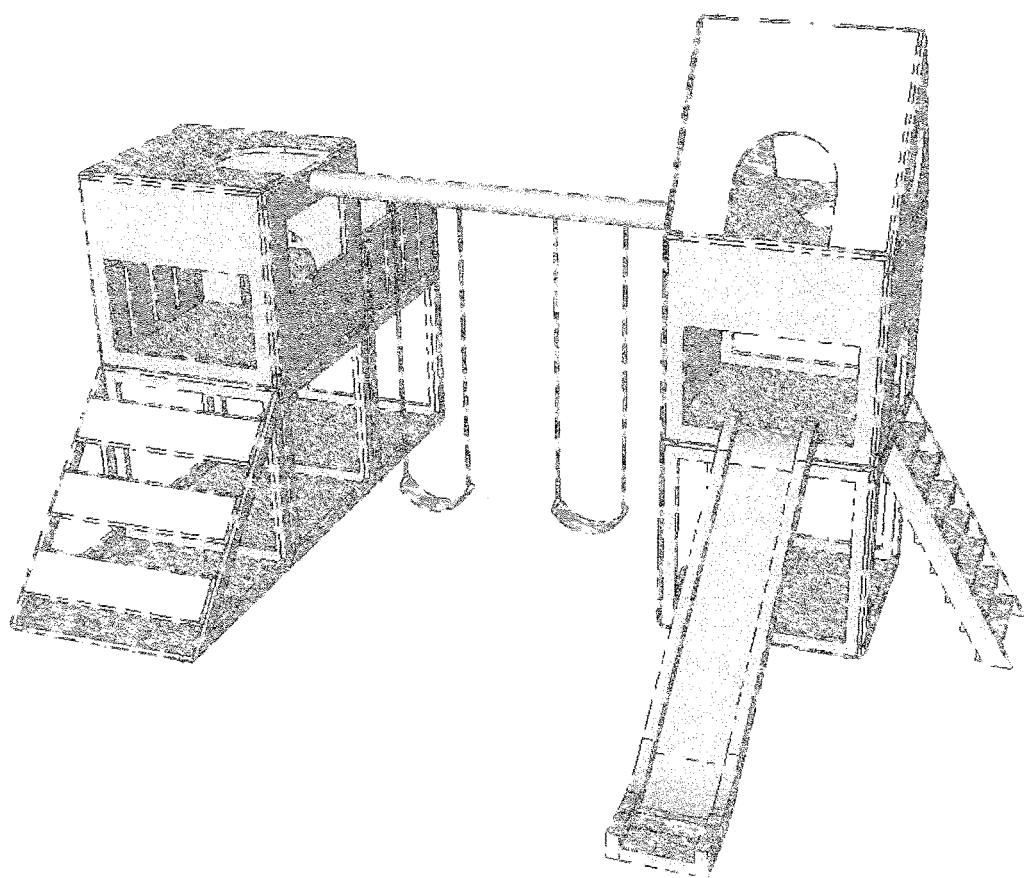

FIG. 25 generally depicts one aspect of the present invention, a perspective view demonstrating the use of clips to attach panels and other objects to form a play ground set or jungle gym.

DETAILED DESCRIPTION OF THE INVENTION

Definitions

Unless defined otherwise, all technical and scientific terms used herein have the same meaning as commonly understood by one of ordinary skill in the art to which this invention belongs. Generally, the nomenclature used herein and described below are well known and commonly employed in the art. Where a term is provided in the singular, the inventors also contemplate the plural of that term, and when a term is provided in the plural, the inventors also contemplate the singular of that term. The nomenclature used herein and the procedures described below are those well-known and commonly employed in the art unless set forth otherwise. As employed throughout the disclosure, the following terms, unless otherwise indicated, shall be understood to have the following meanings:

While the invention is primarily described in carpentry and construction applications, it is understood that the present invention is not so limited and may be employed to secure any objects to one another. It may also be scaled up or down to suit the size and mass of the planes/components. Other applications include, for example, but not limited to, the use of the clip assemblies in shelving, toys, building sets, pet furniture, storage, book shelves, cabinets, solar panels, modular offices, storage sheds, modular buildings and barracks.

Reference in this specification to "one embodiment/aspect" or "an embodiment/aspect" means that a particular feature, structure, or characteristic described in connection with the embodiment/aspect is included in at least one embodiment/aspect of the disclosure. The use of the phrase "in one embodiment/aspect" or "in another embodiment/aspect" in various places in the specification are not necessarily all referring to the same embodiment/aspect, nor are separate or alternative embodiments/aspects mutually exclusive of other embodiments/aspects. Moreover, various features are described which may be exhibited by some embodiments/aspects and not by others. Similarly, various requirements are described which may be requirements for some embodiments/aspects but not other embodiments/aspects. Embodiment and aspect can be in certain instances be used interchangeably.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

The term "male" refers to an object that is designed with a projecting part for fitting into a corresponding female part, and may be static or comprised of a moving mechanical part such as a latch or fastener. The term "female" refers to an object that is designed with a hollow or groove into which a corresponding male part fits, and may be static or comprised of a moving mechanical part such as a latch or fastener. "Orthogonal" refers to objects or planes intersecting or lying at right angles. "Bevelled" refers to a sloping/slanted surface that does not form a right angle with adjacent surfaces. "Flange" refers to a projecting rim, collar, or ring on a shaft, pipe, machine housing, etc., cast or formed to give additional strength, stiffness, or supporting area, or to provide a place for the attachment of other objects. "Internal" refers to situated or existing in the interior of something. Extrude refers to protrude or to extend outward. "Symmetric" refers to characterized by or exhibiting symmetry; well-proportioned, as a body or whole; regular in form or arrangement of corresponding parts. "Included Angle" refers to the angle between two sides of a triangle. "Isosceles" refers to a triangle having two equal sides. "Cam" refers to a disk, cylinder or shaft having an irregular form such that its motion, usually rotary, gives to a part or parts in contact with it a specific rocking or reciprocating motion. "Truss" refers to any of various structural frames based on the geometric rigidity of the triangle and composed of straight members subject only to longitudinal compression, tension, or both. "Assembly" refers to a two or more clips that are joined to one another.

It will be appreciated that terms such as "front," "back," "top," "bottom," "side," "short," "long," "up," "down," and "below" used herein are merely for ease of description and refer to the orientation of the components as shown in the figures. It should be understood that any orientation of the components described herein is within the scope of the present invention.

Other technical terms used herein have their ordinary meaning in the art that they are used, as exemplified by a variety of technical dictionaries.

Introduction

The present invention recognizes that there exists a long felt need for a clip assembly that it more user friendly, reliable, secure and versatile than currently available clip assemblies.

As a non-limiting introduction to the breath of the present invention, the present invention includes several general and useful aspects, including:

1) A clip assembly in which the male and female clip features are present on each clip.
2) A clip assembly in which the male and female mating features are located on two opposing planes symmetric about the clip body such that symmetric planes form the legs of an isosceles triangle whose included angle may be any angle as required.
3) A clip assembly in which two additional planes internal to the clip body on the female side form a load-bearing interface, wherein the planes form the legs of an isosceles triangle whose base is formed by the plane locating the female feature.
4) A clip assembly that can be used when panels are to be secured perpendicular to each other such that the planes containing the male and female features are at 90° to each other and each at 45° to the internal load-bearing mating planes forming a right isosceles triangle and the internal mating feature planes form the legs of a right isosceles triangle.
5) A clip assembly wherein a unique universal and expandable panel mating system does not limit the orientation, position, or number of objects or panels that can be attached to one another.
6) A clip assembly wherein clips are mounted symmetrically about the panel midline in pairs, or in any even integer, and with each symmetric clip-pair oriented in the same way to each other such that panels may be universally mated together along panel edges and panels can be rotated about panel center axes and mated in any orientation as allowed by the panels' shape and size.
7) A clip assembly wherein clips can be mated by pressing or snapping the male and female features together.
8) A clip assembly wherein a specialized tool is inserted into the slots and rotated so that the tool acts as a cam on the ramp features to pry open the beams of the female feature. When the tool is released or rotated in the opposite sense and removed, the beams of the female feature once again are allowed to close.
9) A clip assembly with an internal latching clip to allow individual clips to be latched to one another and/or unlatched by shifting a lever.
10) A clip assembly with an internal fastening clip wherein a bolt or rotational cam-style fastener allows individual clips to be secured to one another.
11) A method of using the clip assemblies of the invention to secure panels together for assembly of furniture or a structure such as an office cubicle, solar panel frame or truss, jungle gym or shelter.

These aspects of the invention, as well as others described herein, can be achieved by using the methods, articles of manufacture and compositions of matter described herein. To gain a full appreciation of the scope of the present invention, it will be further recognized that various aspects of the present invention can be combined to make desirable embodiments of the invention.

I Clip Assembly with Male And Female Features on Planes Symmetric Out the Body Clip Generally the present invention relates to a multiuse clip assembly wherein each clip includes both a male feature (1) and female feature (2). The clips can be used to secure panels or objects to one another for which the unique characteristics of the invention applies. Generally the invention is made of a thermoplastic material, though any other material or combination of materials may be used providing the material(s) possess the properties for the invention to work as described herein. When made from thermoplastic material, the invention can be manufactured in an injection molding process, though any other manufacturing processes may be used as applicable to the material being used.

Conventional fasteners are designed with mating features oriented along a common axis (as in a screw and nut or threads). The present invention employs a unique arrangement such that a clip body includes both a male feature (1) and a female feature (2) wherein the male and female mating features are located on two opposing planes symmetric about the clip body, whose plane of symmetry (21) is defined by a plane passing through the middle of the of the clip body. These defined symmetric planes form the legs of an isosceles triangle (22) whose included angle may be any angle as required. Two additional planes (8) internal to the clip/fastener body on the female side form a load-bearing interface, wherein the planes form the legs of an isosceles triangle (23) whose base is formed by the plane locating the female feature. The included angle of the two internal planes is any angle as required.

II Clip Assembly with Snap Fit Male And Female Features on Orthonogal Planes

The present invention can include a multiuse "snapping" clip assembly. Some features of the invention are the male (1) and female clip (2) features, one each of which are located on one of two orthogonal planes (3). The two orthogonal planes are themselves oriented at 45° (4) to the main body of the clip.

Here, the female feature (2) includes two flexible parallel beams (5) extruded from the main body of the clip, the ends upon which are located capture features with dual beveled edges, one outside (6) and one inside (7). Between the two parallel beams (5) and formed by the central rib of the clip body are two orthogonal surfaces (8), one of which is oriented normal and the other parallel to the body of the clip, both of which are at 45° to the female feature.

The male feature (1) includes a single extruded T-shaped beam (9) with beveled edges (10) on the top surface of the flange and flat faces or beveled edges (11) on in the inside of the flange. The ends of the T-shaped beam (9) are shaped such that two orthogonal planes are formed (12), one of which is oriented normal and the other parallel to the body of the clip, both of which are at 45° to the male feature (1), upon which is located one groove (13) on each plane.

Ramp features (14) may be located on both inside faces of each parallel beam (5) of the female feature (2), with a slot feature (15) located adjacent to each beam (5) in the walls of the clip body. Both of these features may be used together with a tool to facilitate locking and unlocking of the female feature (2) for either assembly or disassembly of two clips.

III Clip Assembly with Two Internal Planes That Form A Load-Bearing Surface

Figure 3:
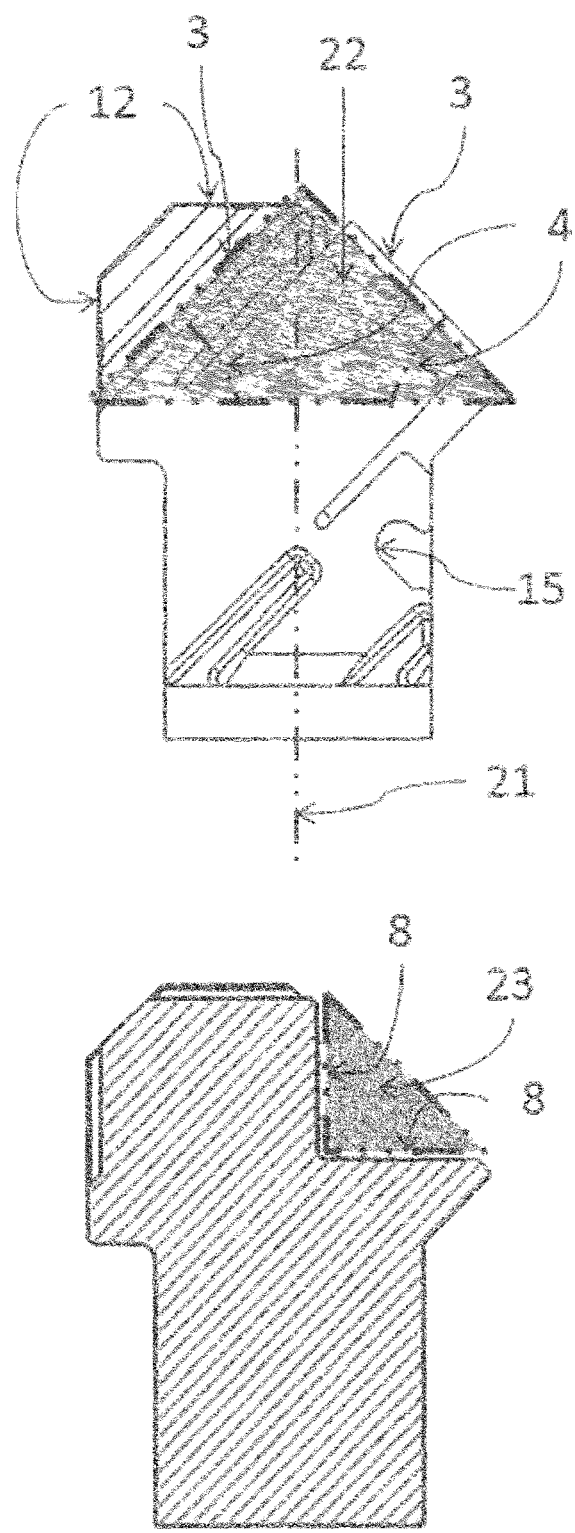
FIG. 3 generally depicts one aspect of the present invention, a side-view of a clip and a cross sectional view of a clip. The male feature and female features are located on one of two planes (3) symmetric about the clip body, whose plane of symmetry (21) is defined by a plane passing through the middle of the of the clip body, and which form the legs of an isosceles triangle (22). Two additional planes (8) internal to the clip/fastener body on the female side form a load-bearing interface, wherein the planes form the legs of an isosceles triangle (23) whose base is formed by the plane locating the female feature.
Figure 14:
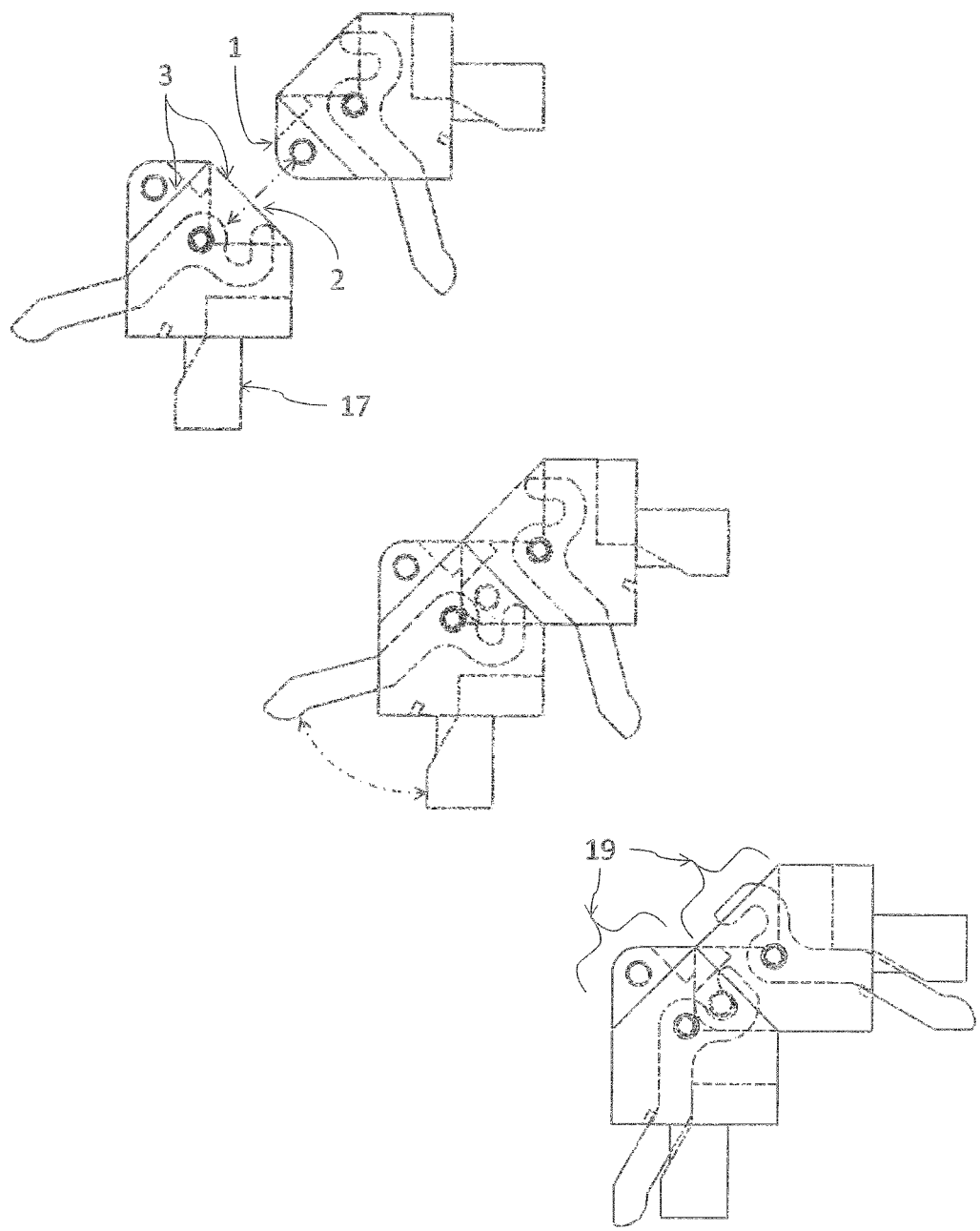
FIG. 14 generally depicts one aspect of the present invention, a side view of clips illustrating the mating and subsequent latching, and showing one of each type of clip feature from each clip body remaining available (19) to assemble more clips after two clips have been mated.

In a preferred embodiment of the invention, clips are located at 90° to each other and with the male and female clip features at 45° (4) to the panels. This is illustrated with a side view of a clip with the dashed horizontal line representing a panel edge (FIG. 3). Internal features (8) mate at 90° to the panels. This is illustrated with the mated pair views of the clips (FIG. 14, 15, 17).

Figure 10:
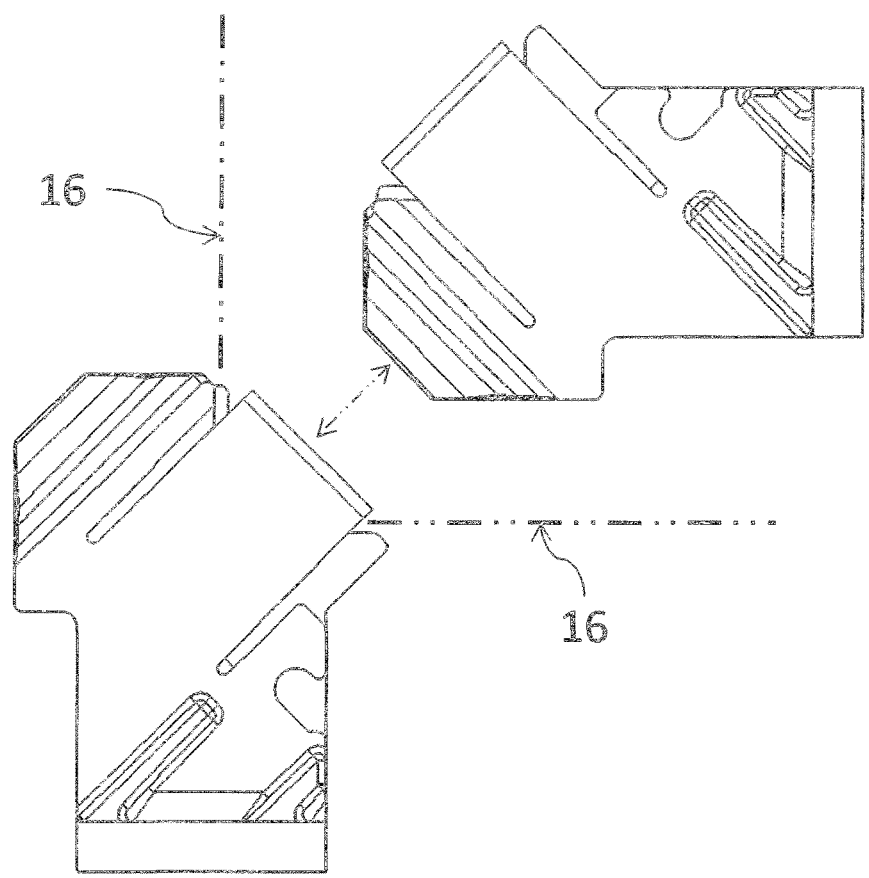
FIG. 10 generally depicts one aspect of the present invention, a side view of a pair of clips. The clips may be mated with one approaching from any direction within a 90° field of view (16) of the mating clip feature provided that the mid-planes of the clips remain coplanar.

A side view of a pair of clips is also depicted. (FIG. 10) The clips may be mated with one approaching from any direction within a 90° field of view (16) of the mating clip feature provided that the mid-planes of the clips remain coplanar.

IV Clip Assembly Used to Secure Panels Perpdenicular to Each Other

Figure 22:
FIG. 22 generally depicts one aspect of the present invention, a side view (20) of solar panels (or other panels) which are secured parallel to one another with mated clips. The arrangement of the individual clips is also depicted.
Figure 23:
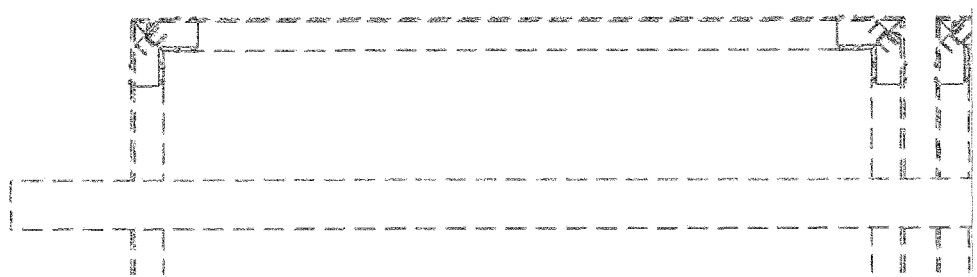
FIG. 23 generally depicts one aspect of the present invention, a bottom view of solar panels (or other panels)

In a preferred embodiment of the invention, clips are located at 90° to each other with the male and female clip features at 45° to the panels. Internal features mate at 90° to the panels. This is illustrated by panels that are secured perpendicular to one another (FIG. 23) as opposed to panels that are parallel to one another (FIG. 22).

V Clip Assembly with Expandable Mating System

Figure 6:
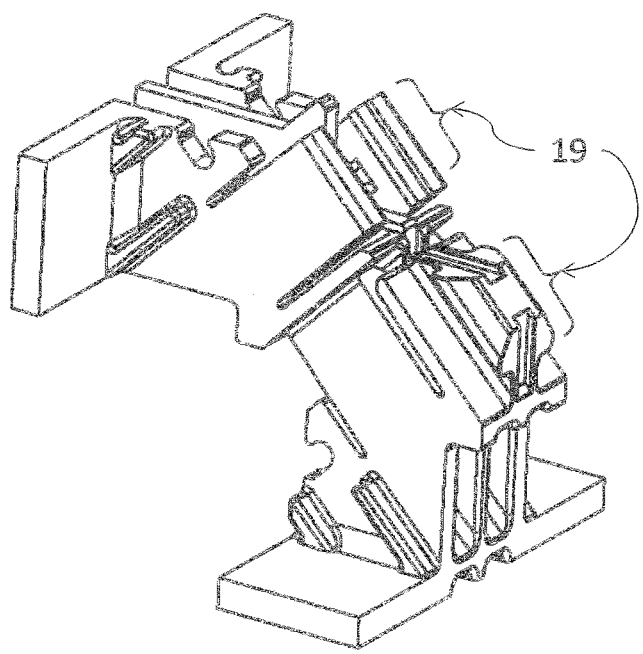
FIG. 6 generally depicts one aspect of the present invention, a perspective view of two mated clips. Because each clip has a male and a female feature, one of each type of clip feature (19) from each clip body will remain available to assemble more clips after two clips have been mated.

Conventional fasteners typically utilize two unique separate male and female parts to mate together one clip to another. This exhausts the mating locations after assembly of the two parts. In the present invention, two mated clips do not exhaust mating locations, but leave two more mating locations (19) for assembly of at least one more clip to the two previously mated clips. (FIG. 6, 8) Clips can be mounted symmetrically about the panel midline in pairs, or in any even integer, and with each symmetric clip-pair oriented in the same way.

The system allows for infinite expandability of the panel structure given that the any panel added to the structure will further add additional mating sites, either along the same mating edge, or elsewhere in the panel structure.

VI Clip Assembly Wherein Clips A Mounted Symmetrically about the Panel Midline in Pairs Panels may be universally mated together along panel edges as illustrated. (FIG. 19) This allows versatility to the use of the panel. Panels can be flipped along panel midlines or rotated about panel center axes and mate in any orientation as allowed by the panels' shape and size, provided that the panels' edges are parallel and aligned at the panel midlines.

Figure 20:
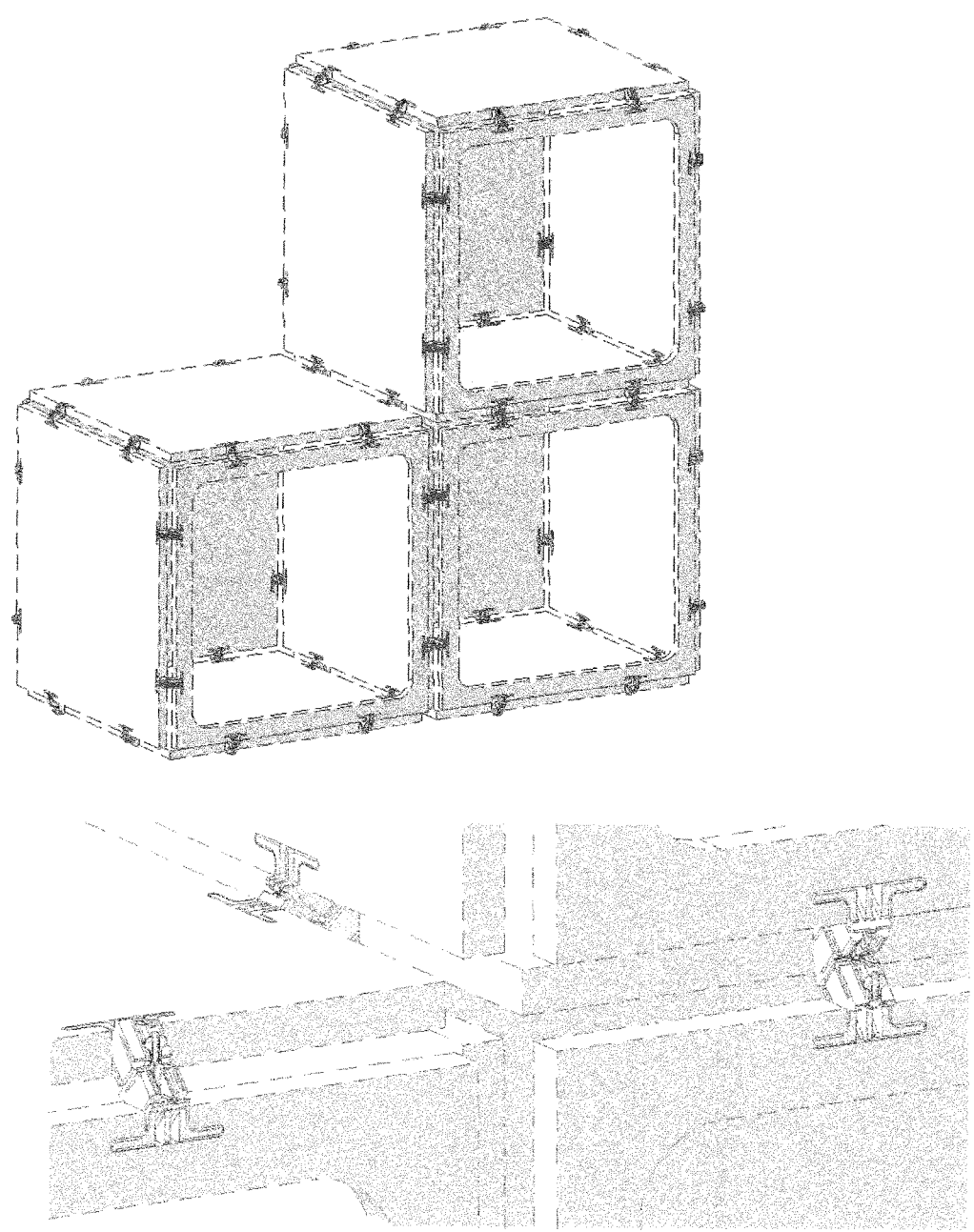
FIG. 20 generally depicts one aspect of the present invention, a perspective view and a close-up view demonstrating the use of paired clips used to form a larger modular-shaped structure with additional panels, showing the universal and expandable aspect of a system of panels utilizing the invention.

Two previously mated panels allow for at least one more panel to universally mate as described above with the two previously mated panels, as illustrated (FIG. 20)

VII Joining or Separating Clips with Flexible Snap-Fit Features

"Snap-Fit" clips can be conducive to lightly loaded structures that are intended to be rearranged, expanded or frequently modified.

Two clips are mated together by inserting the male feature (1) of one clip into the female feature (2) of anther clip. The male feature (1) of one clip can be pushed into the female feature (2) of another clip with enough force so that the beveled top surface flange (10) of the male feature (1) acts as a cam on the outside beveled capture feature (6) of the female feature (2) so as to cause the beams (5) to flex open. The angles of the beveled edge (10) of the male feature (1) and the outside beveled edge (6) of the female capture feature may be varied by design to tailor the mating insertion force if applicable to suite the requirements of the intended end use of the invention. Once the clips are fully mated (FIG. 6) the two orthogonal rib surfaces (8) inside the female feature (2) mate with the two orthogonal surfaces (13) of the male feature (1) which forms the main load bearing interface, and the edges of the groove features further constrain the clips in shear loading applications. Because each clip includes one male (1) and one female (2) feature, one of each type of clip feature from each clip body will remain available (19) to assemble more clips after two clips have been mated.

Figure 8:
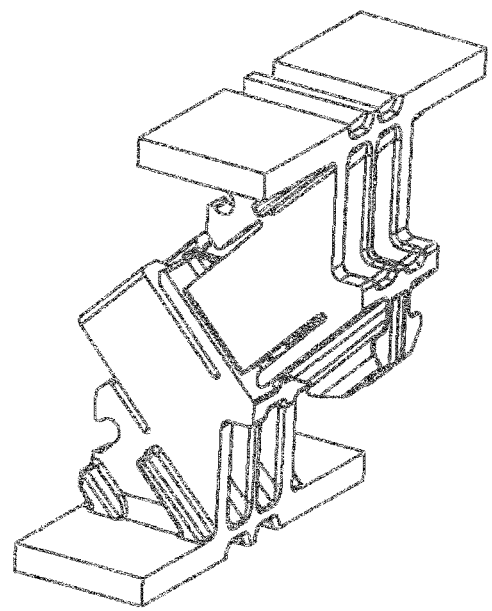
FIG. 8 generally depicts one aspect of the present invention, a perspective view of the stack of clips. If the clips are mated such the clip bodies are parallel, an infinite chain of clips can be mated with at least one clip feature always left available to mate another clip.
Figure 9:
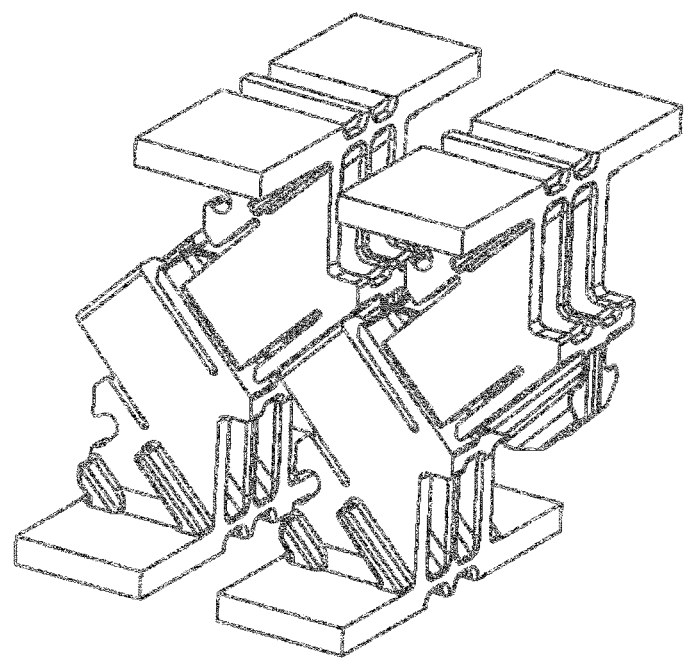
FIG. 9 generally depicts one aspect of the present invention, a perspective view of two stacks of clips demonstrating the infinite stacking capability of the invention.

The 45° arrangement (4) of the male and female features described above allows for two clips to be mated together such that the clips can be oriented either orthogonal (FIG. 6) or parallel (FIG. 8) to each other, depending on the intended use if the invention. Furthermore, the clips can be mated with one clip approaching from any direction within a 90° field of view (16) of the mating clip feature provided that the mid-planes of the clips remain coplanar. If the clips are mated such that the clip bodies are orthogonal to each other (FIG. 6), up to four clip bodies can be mated together in one location (FIG. 7) before exhausting all of the male and female features from all four clip bodies. If the clips are mated such the clip bodies are parallel (FIG. 8), an infinite chain of clips (FIG. 9) can be mated with at least one clip feature always left available to mate another clip.

The clips can be separated or "de-mated" by removing the male feature (1) from the female feature (2). Enough force can be applied in any direction within the 90° planar field-of-view (16) with a sense away from the clip features being de-mated so that the underside of the male flange (11) acts as a cam on the inside beveled capture features (7) of the female feature (2) so as to cause the beams (5) to flex open allowing the male feature (1) to be removed. The angle of the underside of the male flange (11) and the female capture feature bevel (7) can be varied by design to tailor the de-mating force if applicable to suit the requirements of the intended end use of the invention.

VIII Joining or Separating Clips with Flexible Snap-Fit Features with Use of A Tool Snap fit clips can be used for structures with higher loading requirements that are intended to be less frequently rearranged, expanded or modified by varying the angle of the underside of the male flange (11) and the female capture feature bevel (7) such that a tool would be required to separate the clips after assembly.

Figure 11:
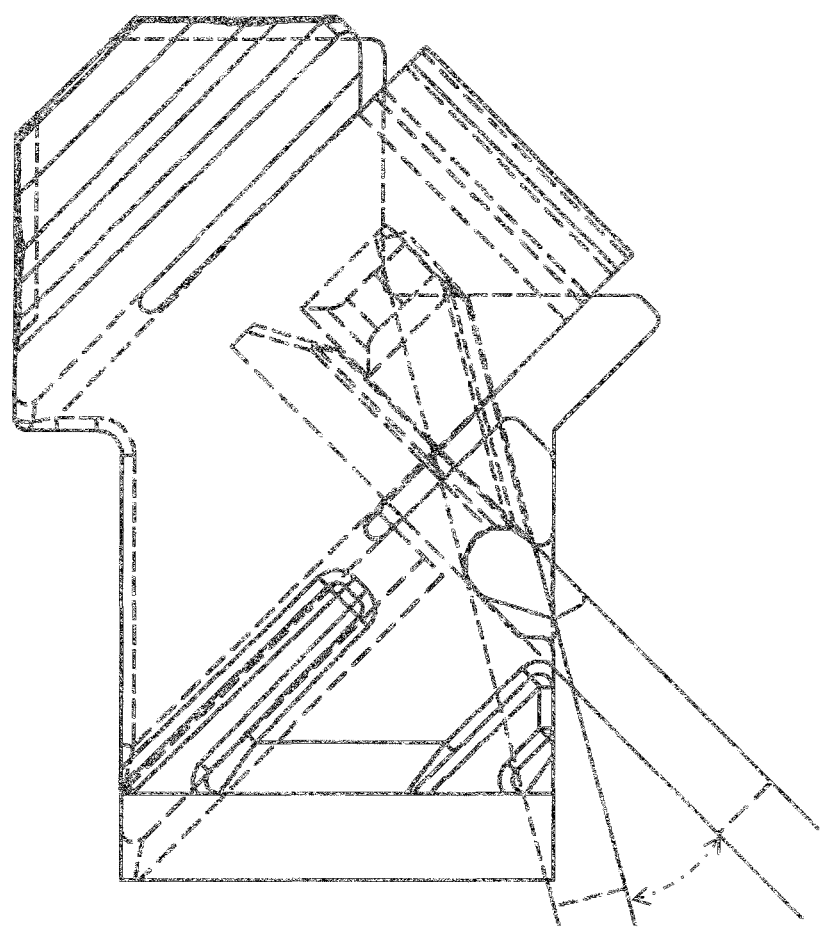
FIG. 11 generally depicts one aspect of the present invention, a side view of a clip. A tool or lever is inserted into the slots and rotated so that the tool acts as a cam on the ramp features to pry open the beams of the female feature. When the tool is rotated in the opposite sense and removed, the beams of the female feature once again are allowed to close.

Ramp features (14) may be located on both inside faces of each parallel beam (5) of the female feature (2), with a slot feature (15) located adjacent to each beam (5) in the walls of the clip body. Both of these features may be used together with a tool to facilitate locking and unlocking of the female feature (2) for either assembly or disassembly of two clips. A tool or lever can be inserted into the slots (15) and rotated so that the tool acts as a cam on the ramp features (14) to pry open the beams (5) of the female feature (2) (FIG. 11). When the tool is rotated in the opposite sense and removed, the beams (5) of the female feature (2) once again are allowed to close (FIG. 11). The ramp features (14) and slots features (15) may be omitted when not required for the intended end use of the invention, or in the case that a different tool is used to achieve the same result that does not require the use of the ramp (14) and/or slot (15) features.

The female feature (2) can be opened using a tool by the method described above before inserting the male feature (1), and reclosing the female feature (2) after the male feature (1) has been inserted by removing the tool as described above. Thus the flange of the male feature (1) is secured by the inside beveled capture features (7) of the female feature (2) acting on the underside of the flange (11) of the male feature (1).

To separate or "de-mate" the female feature (2) can be opened using a tool by the method described above before removing the male feature (1), and reclosing the female feature (2) after the male feature (1) has been removed by removing the tool as described above. The angle of the underside of the male flange (11) and the female capture feature bevel (7) can be varied by design to tailor the de-mating force if applicable to suit the requirements of the intended end use of the invention.

IX Method of Using Clip Assemblies to Secure Panels to Each Other

Figure 12:
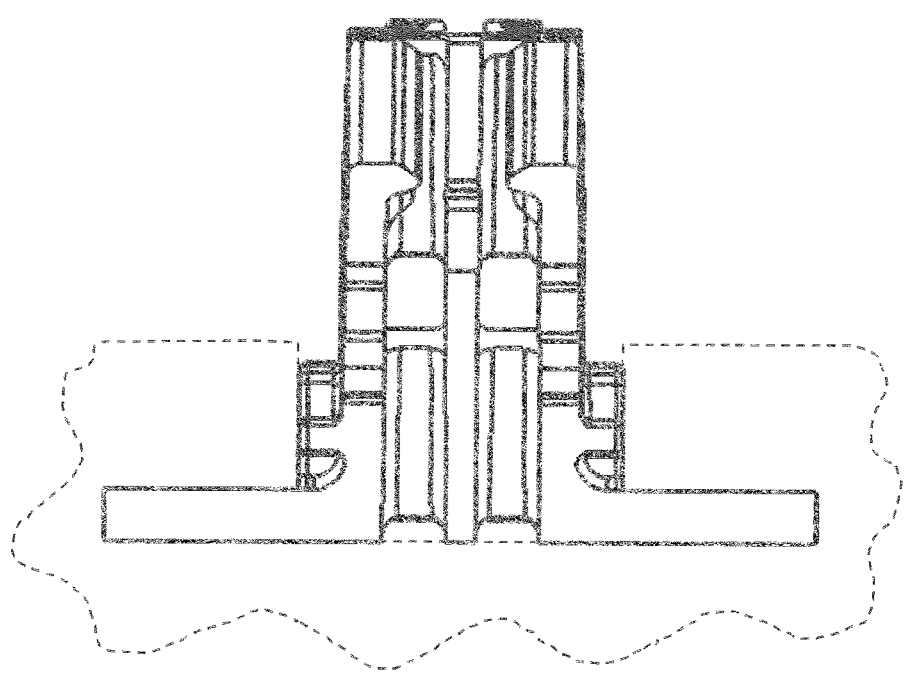
FIG. 12 generally depicts one aspect of the present invention, a front view of a clip. Optional spacer features may be located on each side of the clip body which can act as locating features when the invention is fastened to a panel by way of a T-shaped slot.

Two or more flanges (17), or any other features which may extrude from any part of the clip body, may be used to fasten or otherwise attach the invention to objects or assemblies for which the invention is being used. Optional spacer features (18) may be located on each side of the clip body which can act as locating features when the invention is fastened to a panel by way of a T-shaped slot (FIG. 12). The invention can be fastened or in any other way attached to objects or assemblies for which the invention is being used in any manner that suits the intended end use of the invention, or the invention can be manufactured as an integral part of the object or assembly for which it is being used.

When two panels are mated, one male and one female feature remain to add more panels. Pairs of clips are used on each panel edge. Each pair of clips on each edge are oriented opposite to each other. This allows panels to be flipped and still install.

Alternatively, panels may be secured using clips with the latching mechanism or fastening mechanism.

X Clip Assembly with Internal Latching Mechanism

Figure 13:
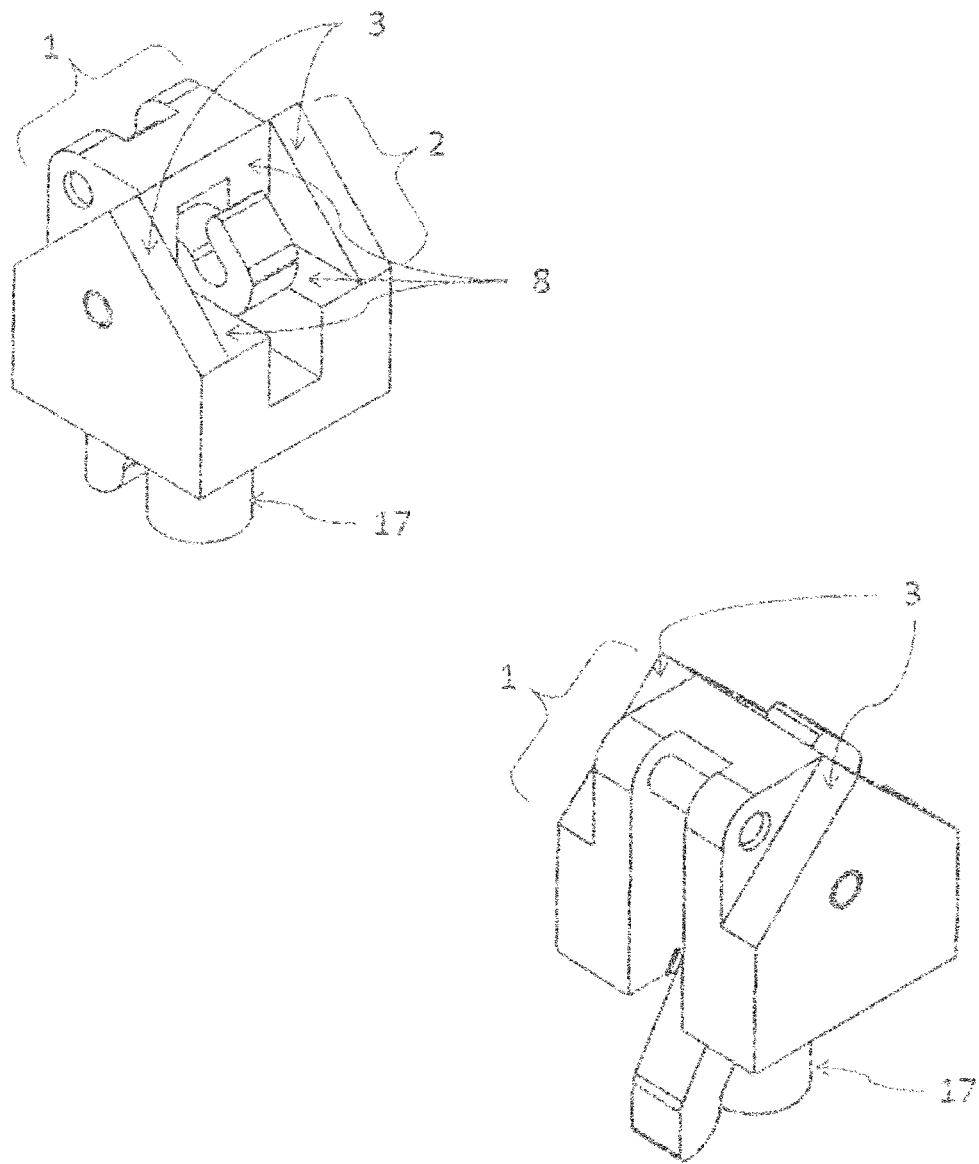
FIG. 13 generally depicts one aspect of the present invention, perspective views of a clip showing a latching mechanism, male (1) and female (2) features, orthogonal planes (3), and mounting feature (17).

As an alternative to snapping features, the clips can include a latching mechanism as illustrated (FIG. 13). The clips can have a built-in positive locking latch feature.

The use of latching clips may be preferred for use in semi-permanent structures which can still be easily taken apart, rearranged, modified and expanded.

XI Clip Assembly with Internal Fastening Mechanism

Figure 17:
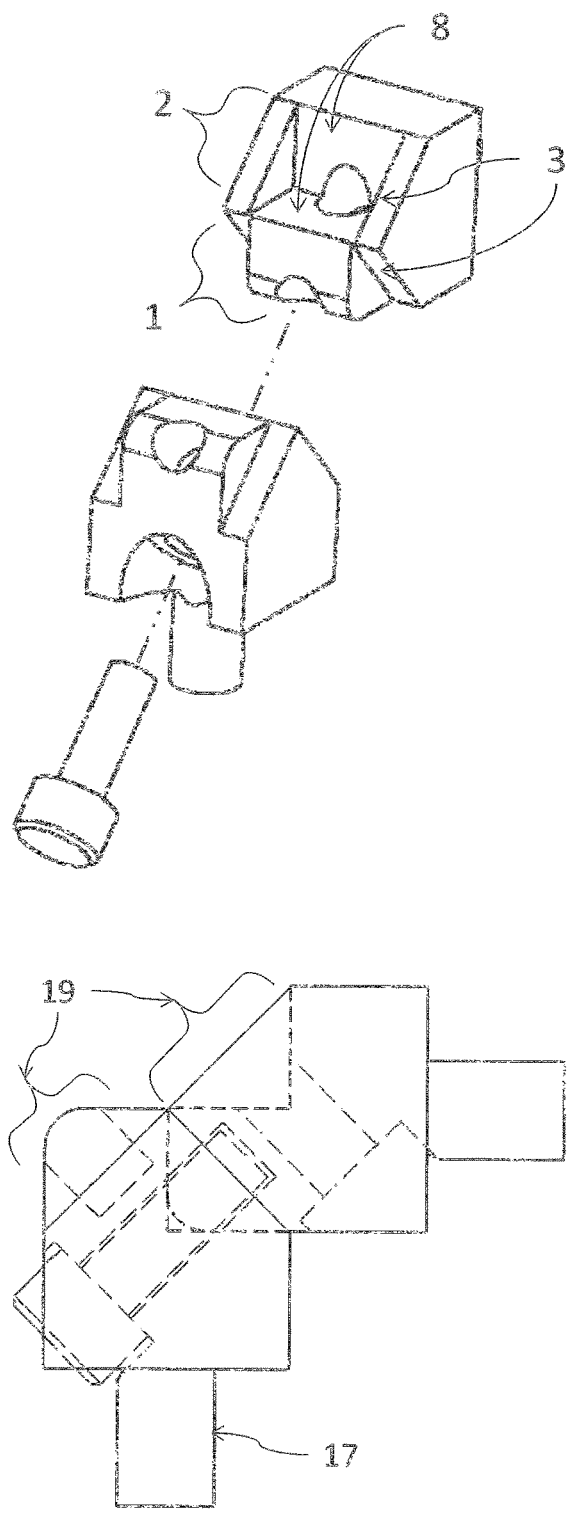
FIG. 17 generally depicts one aspect of the present invention, a perspective view and a side view of clips that are paired and secured with the fastening mechanism, and showing one of each type of clip feature from each clip body remaining available (19) to assemble more clips after two clips have been mated.

As an alternative to snapping or latching features, the clips can include a fastening mechanism as illustrated (FIG. 17). The clips can be fastened together with bolts or cams.

The use of fastening clips may be preferred for use in permanent or semi-permanent structures as well as highly loaded structures.

EXAMPLES

Example 1

Development of Technology

Figure 1:
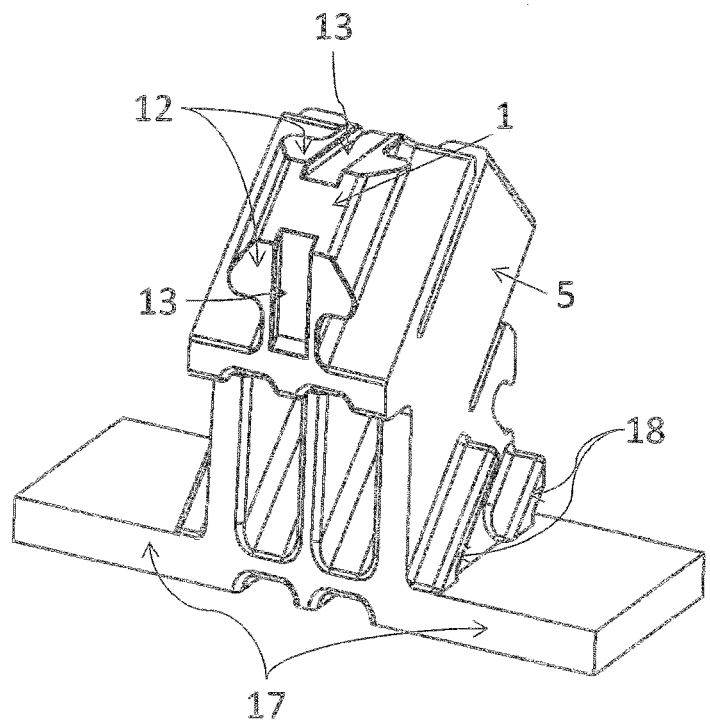
FIG. 1 generally depicts a perspective view of one aspect of the present invention, a clip with the male feature (1).

A clip body (FIG. 1) includes the male feature (1). Two flexible parallel beams (5) are part of the female feature. The ends of the T-shaped beam are shaped such that two orthogonal planes are formed (12) on which are located a groove on each plane (13). Two or more flanges (17) on the base may be used to fasten or otherwise bind the clip to a panel or other object. Spacer features (18) may be located on each side of the clip body which can act as locating features when the invention is fastened to a panel by way of a T-shaped slot.

Figure 2:
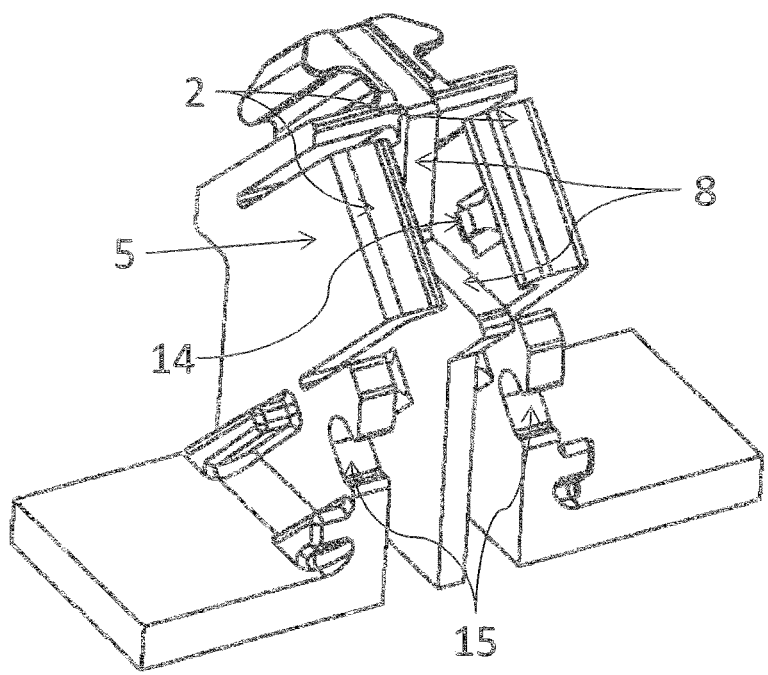
FIG. 2 generally depicts a perspective view of one aspect of the present invention, a clip with the female feature (2).

A different view of the clip body (FIG. 2) shows the female feature (2). Two flexible parallel beams (5) are part of the female feature. Two orthogonal surfaces (8) are formed between the two parallel beams. Ramp features (14) may be located on both inside faces of each parallel beam with a slot feature (15) located adjacent to each beam.

A side-view of a clip (FIG. 3) shows the two orthogonal planes (3) that are oriented at 45° to the main body of the clip (4) whose plane of symmetry (21) is defined by a plane passing through the middle of the of the clip body, and which form the legs of an isosceles triangle (22). Two additional planes (8) internal to the clip/fastener body on the female side form a load-bearing interface, wherein the planes form the legs of an isosceles triangle (23) whose base is formed by the plane locating the female feature. The ends of the T-shaped beam are shaped such that two orthogonal planes are formed (12). A slot feature (15) located adjacent to each beam in the walls of the clip body may be used together with a tool to facilitate locking and unlocking of the female feature for either assembly or disassembly of two clips.

Figure 4:
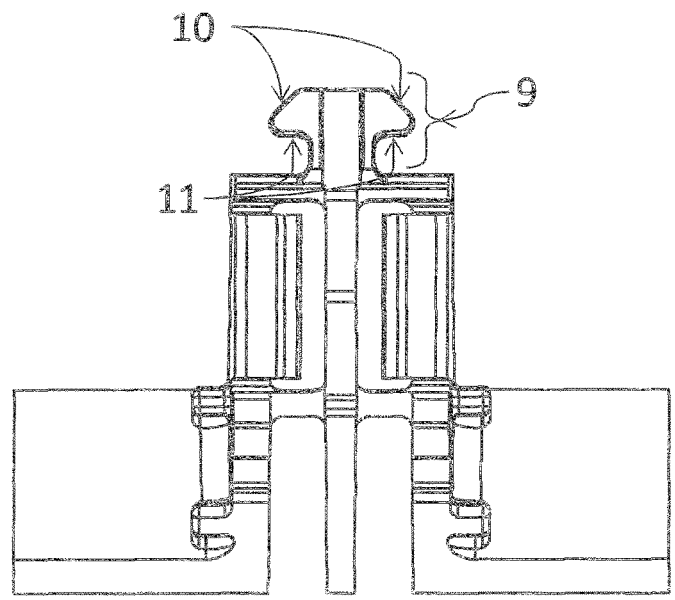
FIG. 4 generally depicts one aspect of the present invention, another view of a clip, The male feature includes a single extruded T-shaped beam (9) with beveled edges (10) on the top surface of the flange and flat faces or beveled edges (11) on in the inside of the flange.
Figure 5:
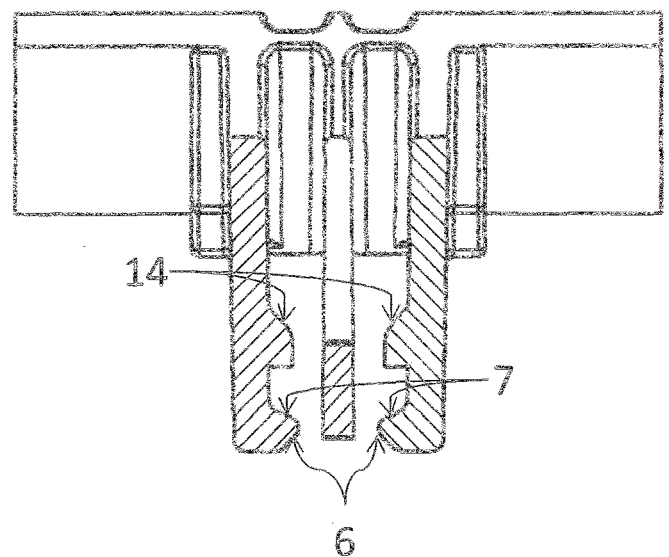
FIG. 5 generally depicts one aspect of the present invention, a cross-section of a clip. The female feature includes two flexible parallel beams extruded from the main body of the clip, the ends upon which are located capture features with dual beveled edges, one outside (6) and one inside (7).

An alternate view of a clip (FIG. 4) shows the extruded T-shaped beam (9), beveled edges (10) and the flat surfaces on the inside of the flange (11). A different angle (FIG. 5) shows the dual beveled edges outside (6), the dual beveled edges inside (7) and the ramp features on both inside faces of each parallel beam (14).

Figure 7:
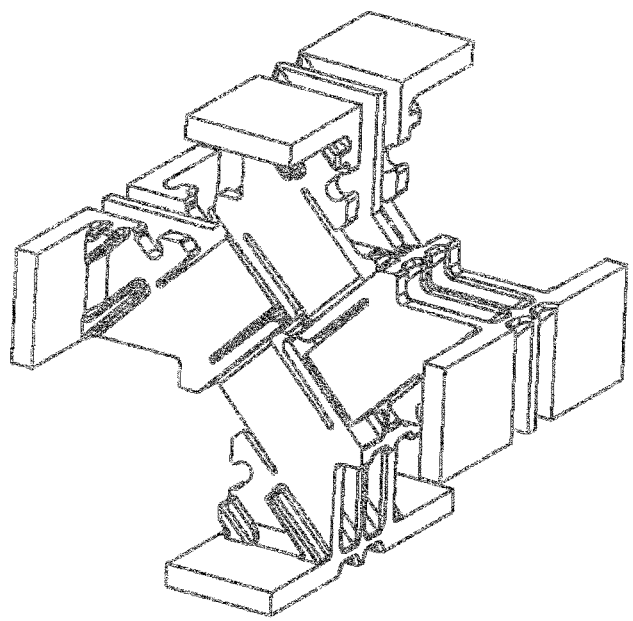
FIG. 7 generally depicts one aspect of the present invention, a perspective view of four clips mated together.

A perspective view of a clip (FIG. 6) illustrates clips that have been paired or mated. Because each clip has a male and a female feature, one of each type of clip feature (19) from each clip body will remain available to assemble more clips after two clips have been mated. Similarly, several (e.g. four) clips can be mated together (FIG. 7). If the clips are mated such the clip bodies are parallel, (FIG. 8, FIG. 9) an infinite chain of clips can be mated with at least one clip feature always left available to mate another clip.

A side view of a pair of clips (FIG. 10) depicts how they can be mated with one approaching from any direction within a 90° field of view (16) of the mating clip feature provided that the mid-planes of the clips remain coplanar.

A side view with dashed-lines representing internal aspects of a clip (FIG. 11) shows how a tool or lever can be used to flex the female features to assist in mating or de-mating clips.

A front view of a clip (FIG. 12) shows optional spacer features located on each side of the clip body which can act as locating features when the invention is fastened to a panel by way of a T-shaped slot. Individual clips can be secured to panels or other objects using an adhesive material such as glue. In the alternative, the clips can be attached with traditional hardware such as screws or bolts.

The latching mechanism is pictured with alternate views (FIG. 13). The male feature (1) and female feature (2) are present with latching features, orthogonal planes (3), and mounting feature (17). Two additional planes (8) form a load-bearing interface.

Figure 15:
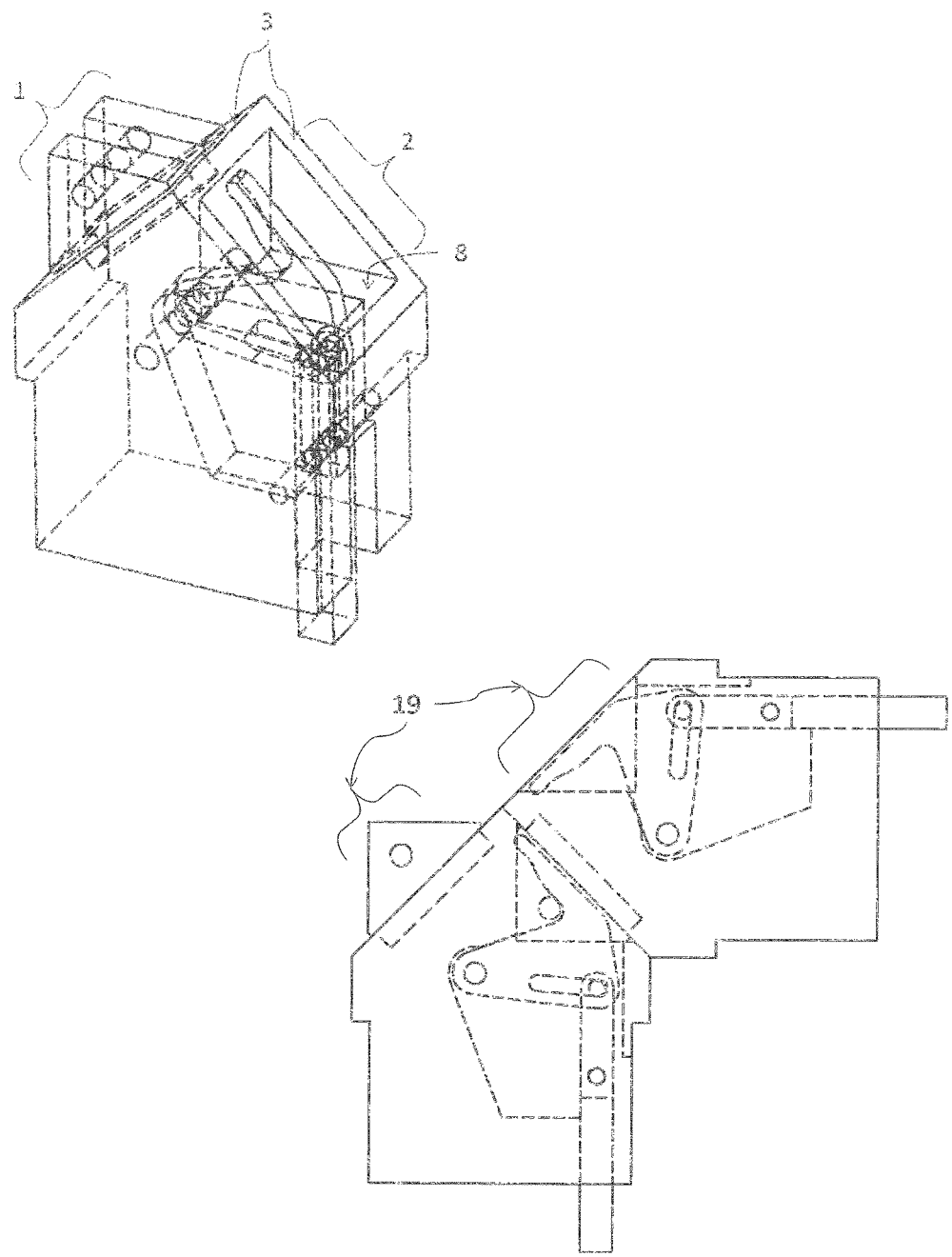
FIG. 15 generally depicts one aspect of the present invention, a perspective view of a clip with male (1) and female (2) features and a side view of two paired clips showing the latching mechanism, and showing one of each type of clip feature from each clip body remaining available (19) to assemble more clips after two clips have been mated.
Figure 16:
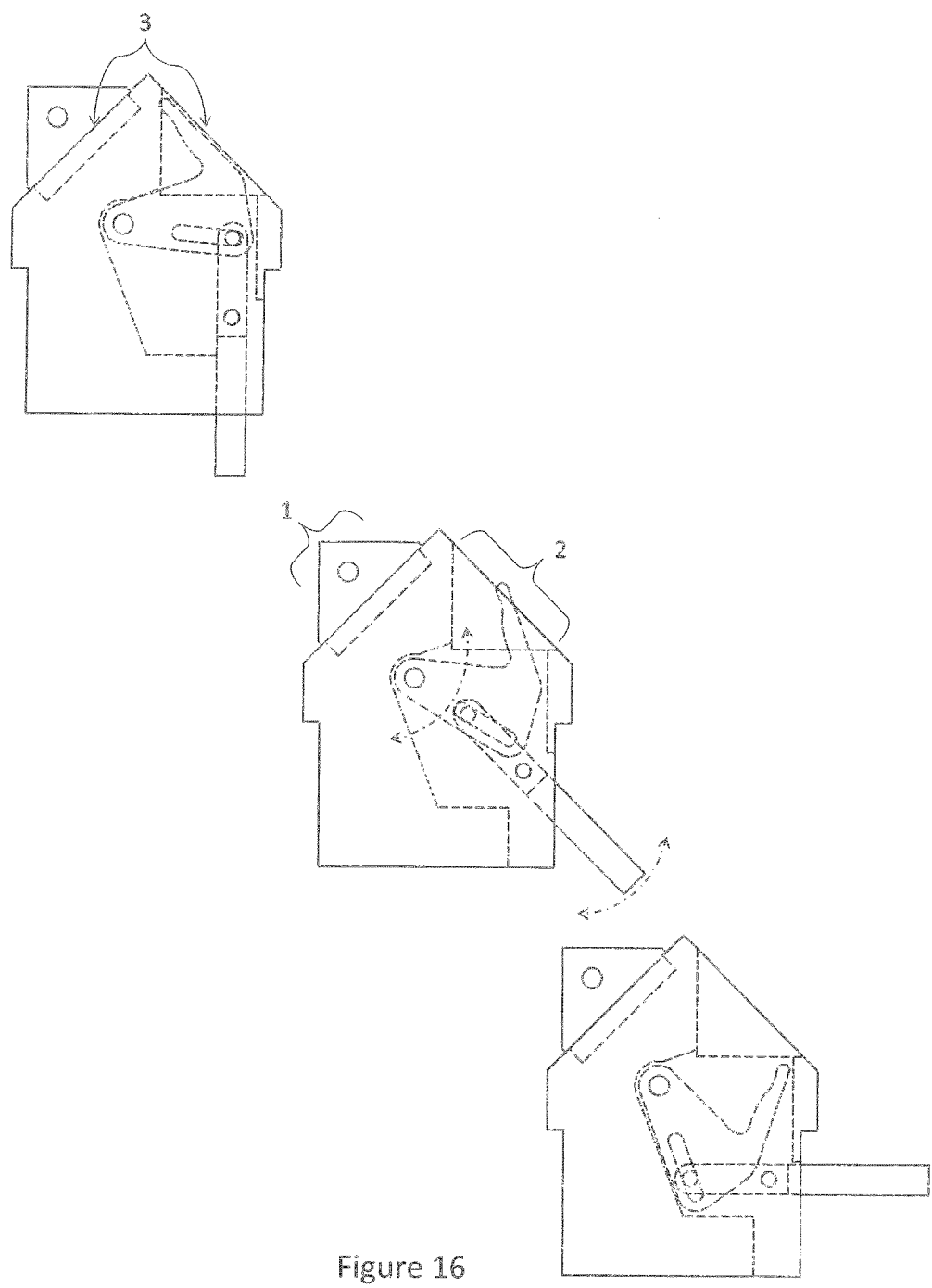
FIG. 16 generally depicts one aspect of the present invention, a side view of a clip showing the sequence of the latching mechanism being actuated.

A side view of clips illustrates the mating and subsequent latching (FIG. 14) of clips. The male feature (1) and female feature (2) are present on two orthogonal planes (3). One of each type of clip feature (19) from each clip body will remain available to assemble more clips after two clips have been mated. Similarly a perspective view details a similar type of latching mechanism (FIG. 15). The male feature (1) and female feature (2) are present on two orthogonal planes (3). One of each type of clip feature (19) from each clip body will remain available to assemble more clips after two clips have been mated. A side view of a clip with dashed-lines for internal parts illustrates the mechanics of a type of latching system (FIG. 16). The male feature (1) and female feature (2) are present on two orthogonal planes (3).

Figure 18:
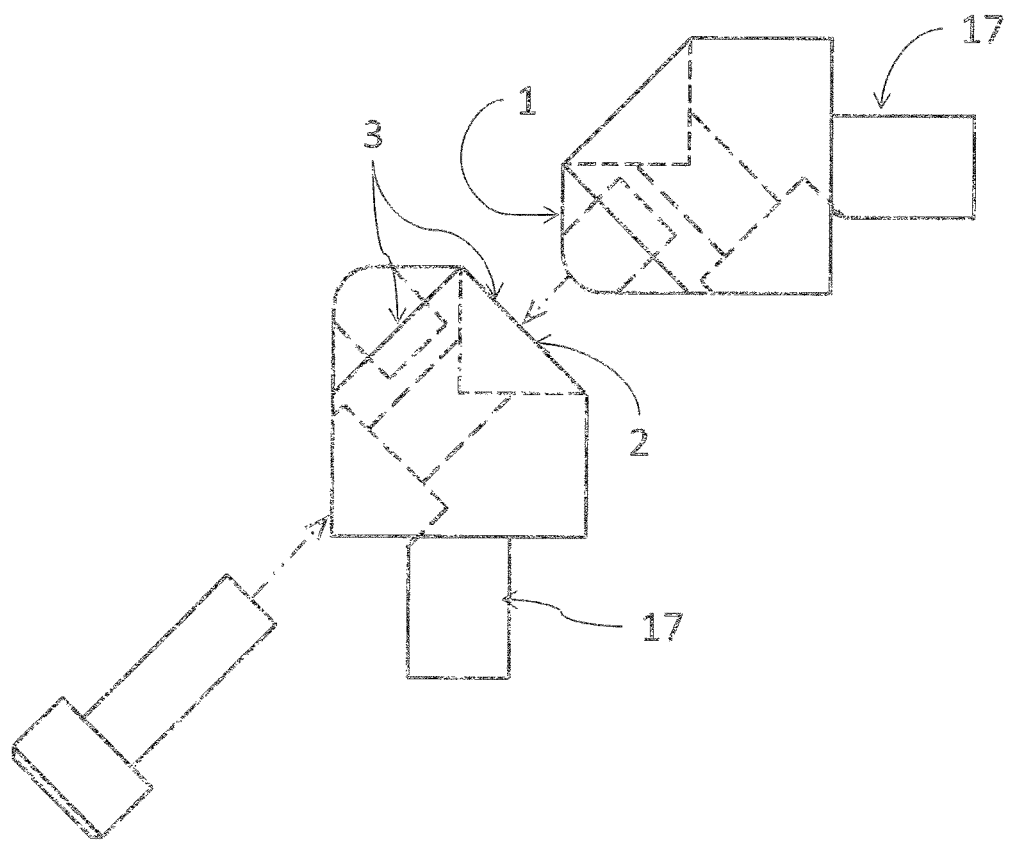
FIG. 18 generally depicts an exploded side view of a two clips showing the fastening mechanism, with male (1) and female (2) features.

A perspective view and a side view of clips that are paired and secured with the fastening mechanism (FIG. 18). The male feature (1) and female feature (2) are present on two orthogonal planes (3). One of each type of clip feature (19) from each clip body will remain available to assemble more clips after two clips have been mated A side view of a clip with dashed-lines for internal parts illustrates the mechanics of the fastening system (FIG. 18). The male feature (1) and female feature (2) are present on two orthogonal planes (3).

Figure 19:
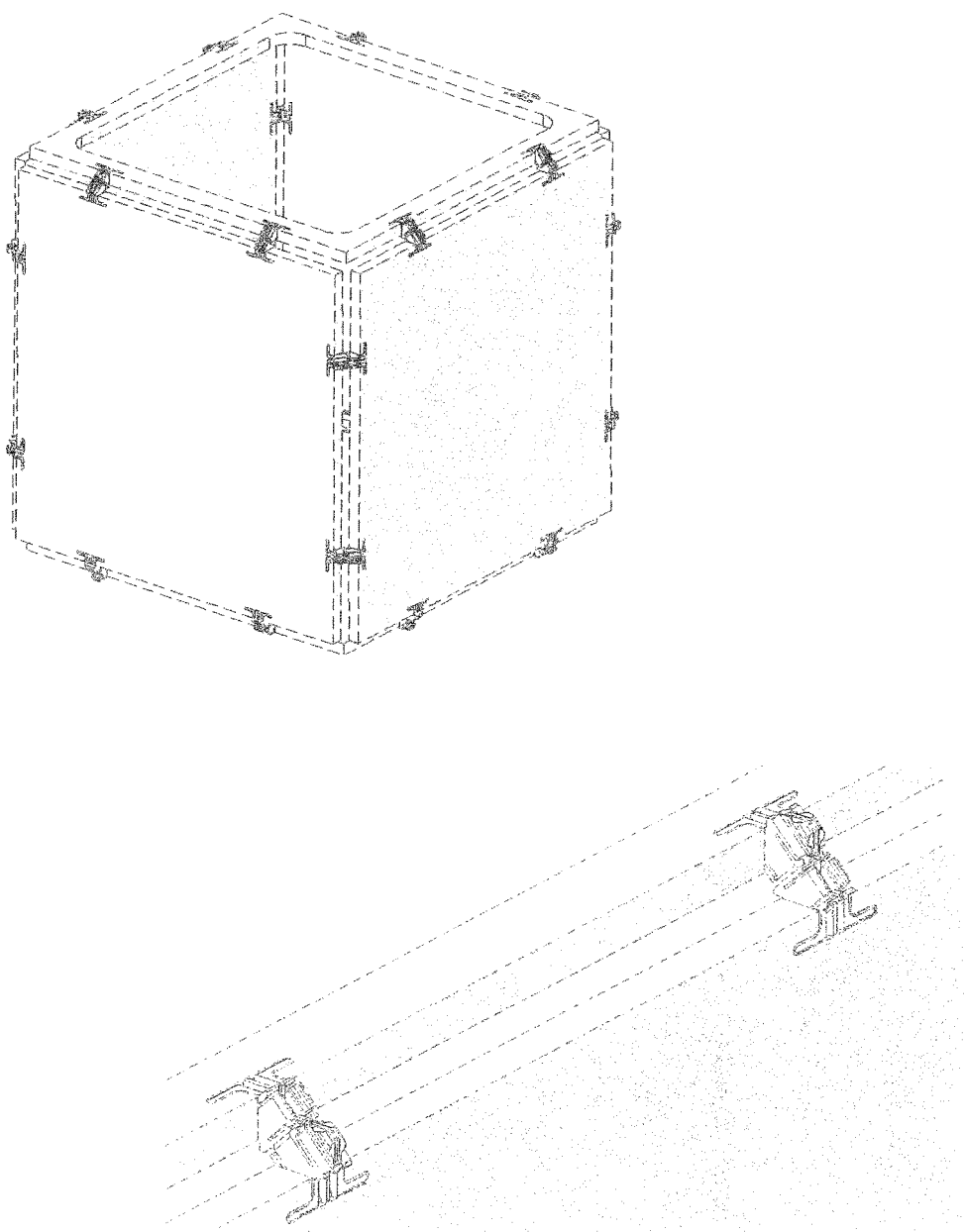
FIG. 19 generally depicts one aspect of the present invention, a perspective view and a close-up view demonstrating the use of paired clips to attach panels to form a modular-shaped structure.

A perspective view and a close-up view demonstrating the use of paired clips to attach panels to form a modular-shaped structure (FIG. 19). Similarly the use of paired clips can be used to attach additional panels (FIG. 20).

Figure 21:
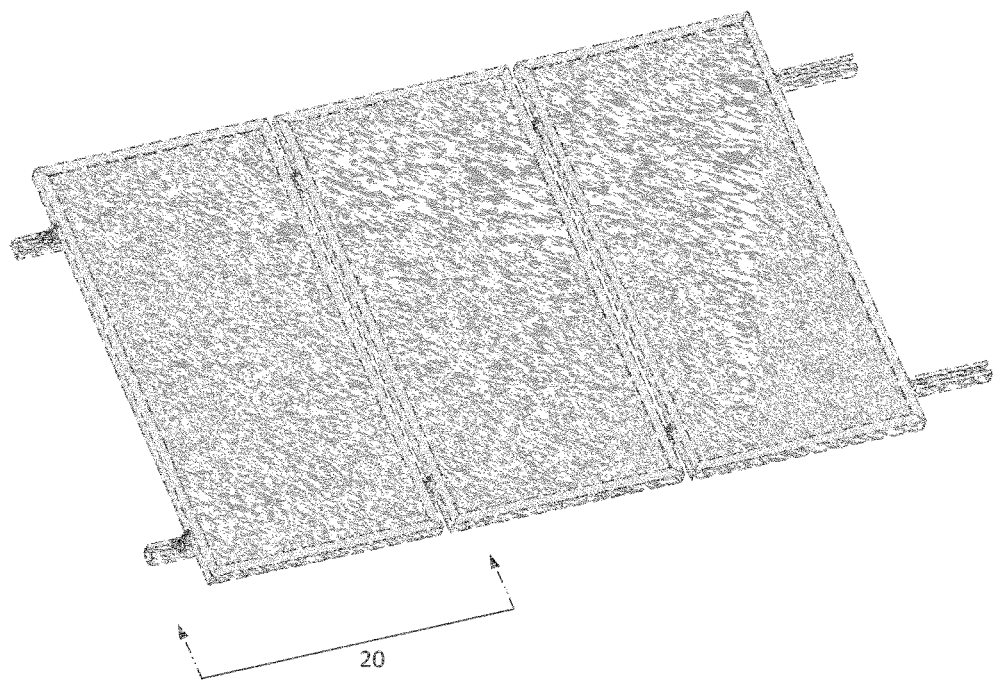
FIG. 21 generally depicts one aspect of the present invention, a perspective view of solar panels (or other panels) which are secured to one another with mated clips.

Another use of the invention includes attaching solar panels to supports with mated clips (FIG. 21). A side view (20) of the solar panels illustrates details of the clip arrangements (FIG. 22, 23). The clips can be used to attach panels to form a shelter or structure (FIG. 24) without the hardware and efforts of traditional designs. The invention is also well suited to attach panels and other objects to form a playground set (FIG. 25).

This example provides for and establishes the early development of the technology and prototype clip assembly, methods of making same, and methods of using same.

Generally the invention is made of a thermoplastic material, though any other material or combination of materials may be used providing the material(s) possess the properties for the invention to work as described herein. Generally when made from thermoplastic material the invention is manufactured in an injection molding process, though any other manufacturing processes may be used as applicable to the material being used. For example, the clips and components can be made from metal or similar material.

Example 2

Using the Technology

Basic Structure Example

This arrangement allows for versatility as panels or objects can be rotated and/or flipped in any axis as needed and still clip into existing structures. Panels or other objects can be added to one another without the use of tools or additional hardware.

Flat Panel Mounting Details

Panels can be prefabricated and include clips secured to edges as illustrated (FIG. 19). This allows the user to readily connect panels to one another to assemble a structure. With snapping clips, the user merely attaches panels by "snapping" the corresponding clips to one another. For greater durability, the latching or fastening clips may be used The invention is particularly well suited to attaching solar panels to a roof, as illustrated (FIG. 21). The versatile nature of the clips allow panels to be easily attached parallel to one another or perpendicular to one another as illustrated (FIG. 22).

Basic Modular Structure

Panels can be prefabricated and include clips secured to edges. This allows the user to readily connect panels to one another to assemble a structure. With snapping clips, the user merely attaches panels by "snapping" the corresponding clips to one another. For greater durability, the latching or fastening clips may be used.

Panels are universal so that they can be rotated and/or flipped in any axis as needed and still clip into existing structures. Further, panels may be added to any structure at any time ad infinitum without modification to either the existing structure or the added panels.

The system is scalable and may be used for table-sized systems to large buildings.

Panels may be shipped flat so that space is saved. For example, if used for assembling emergency disaster shelters, many shelters can be shipped on a single truck.

The panel system allows structures to be quickly assembled on site in any size, to suit the required use. Further, panels are universal and can be used to modify or expand structures as needed.

Basic Shelter Structure

Large wall panels can be prefabricated and include clips secured to edges. They are packed and shipped to the retailer and/or the user, and many flat panels can be efficiently transported on the trailer of a truck.

The panel system allows the consumer to quickly assemble any sized shelter or storage structure to fit his/her needs as illustrated (FIG. 24). Because the panels are universal, they can be used to modify or expand any structure as needed or desired. The system is also cost effective for the consumer because it can be easily modified and infinitely expanded and modified.

Playground or Jungle Gym Structure

As described, panels can be prefabricated and include clips secured to edges so that they are easily packed and shipped.

The panel system allows the consumer to quickly assemble any sized structure to fit his/her needs as illustrated (FIG. 25). Because the panels are universal, they can be used to modify or expand any structure as needed or desired. This allows the user to modify or expand the playground/jungle gym according to his/her desires.

This example provides for and establishes the early development of the technology and prototype, methods of making same, and methods of using same.

Further refinements are made and further prototypes and preferred embodiments developed. The product depicted in the figures result from such efforts.

All publications, including patent documents and scientific articles, referred to in this application and the bibliography and attachments are incorporated by reference in their entirety for all purposes to the same extent as if each individual publication were individually incorporated by reference.

All headings are for the convenience of the reader and should not be used to limit the meaning of the text that follows the heading, unless so specified.

What is claimed is:

1. A modular panel construction system for assembly of panel structures, comprising:
   a) at least one first panel assembly comprising at least one first panel and at least one first modular construction clip assembly;
   b) at least one second panel assembly comprising at least one second panel and at least one second modular construction clip assembly;
   wherein said at least one first panel assembly and said at least one second panel assembly can secure said first and second panels together;
   further wherein said first and second modular construction clip assembly comprise one or more unitary clips that when operably engaged can secure two or more objects together;
   each unitary clip comprising:
      a clip body, comprising:
         i) at least one first side;
         ii) at least one second side;
         iii) at least one protruding load bearing interface; and
         iv) at least one recessive load bearing interface;
      a) wherein said first side and said second side are comprised of two opposing symmetric orthogonal planar structures which meet at the midline of said clip body and form two sides of a triangle;

b) further wherein said protruding load bearing interface and said recessive load bearing interface are located on said two opposing symmetric orthogonal planar structures of said clip body, comprising;
  i) at least two planar structures on said first side of said clip body which form said protruding load-bearing interface;
  ii) at least two planar structures on said second side of said clip body which form said recessive load-bearing interface to operably engage said protruding load-bearing interface from a separate unitary clip body;
  iii) wherein said planar structures which form said protruding load bearing interface are distinct structures from said planar structures which form said recessive load bearing interface;
  iv) wherein the shape of said protruding load-bearing interface and the shape of said recessive load-bearing interface are triangular, and
  v) further wherein the proportions of said triangular protruding load-bearing interface are complementary to the proportions of said triangular recessive load-bearing interface so as to operably engage each other;
c) further wherein at least one first securing mechanism and at least one second complimentary securing mechanism are located within said clip body, with said second securing mechanism complimentary to said first securing mechanism so as to operably engage said first securing mechanism from a separate unitary clip body, comprising;
  i) said first securing mechanism comprising a single extended T-shaped beam, and said second complimentary securing mechanism comprising two or more parallel beams that extend from said clip body to operably engage said T-shaped beam from a separate unitary clip body, or;
  ii) said first securing mechanism comprising a catch or a pin, and said second complimentary securing mechanism comprising a moveable latch or a lever to operably engage said catch or a pin from a separate unitary clip body, or;
  iii) said first securing mechanism comprising a screw, a bolt, or a cam-style fastener; and said second complimentary securing mechanism comprising threads or a cam-lock to operably engage said screw, bolt, or cam-style fastener from a separate unitary clip body;
d) further wherein two or more unitary clips can operably engage each other by way of:
  i) said protruding load bearing interface operably engaging said recessive load bearing interface;
  ii) said first securing mechanism operably engaging said second complimentary securing mechanism; or
  iii) a combination thereof;
e) further wherein said clip body comprises:
  i. at least one panel of said at least one first panel assembly, said at least one second panel assembly, or a combination thereof or;
  ii. at least one structure to secure said unitary clip to a first panel or a second panel of said at least one panel assembly or said at least one second panel assembly, comprising;
     at least one protrusion extending from said clip body which can be used to fasten, bond, clamp, or otherwise attach said unitary clip to said first panel or said second panel; and f) further wherein said clip assembly can secure two or more panels together.

2. The clip assembly of claim 1,
wherein said first securing mechanism comprises a single extended T-shaped beam, and said second complimentary securing mechanism comprises two or more parallel beams that extend from said clip body to operably engage said T-shaped beam from a separate unitary clip body.

3. The clip assembly of claim 1,
wherein said first securing mechanism comprises a catch or a pin, and said second complimentary securing mechanism comprises a moveable latch or a lever to operably engage said catch or a pin from a separate unitary clip body.

4. The clip assembly of claim 1,
wherein said first securing mechanism comprises a screw, a bolt, or a cam-style fastener; and said second complimentary securing mechanism comprises threads or a cam-lock to operably engage said screw, bolt, or cam-style fastener from a separate unitary clip body.

5. The clip assembly of claim 1,
wherein said unitary clip is made as a single piece extrusion.

6. The clip assembly of claim 1,
wherein said first securing mechanism or said second securing mechanism is the same configuration or substantially the same configuration as said protruding load bearing interface or said recessive load bearing interface.

7. The clip assembly of claim 1,
wherein said clip body comprises said at least one first panel, said at least one second panel, or a combination thereof.

8. The panel assembly of claim 1,
wherein said at least one first panel, said at least one second panel, or a combination thereof comprises said clip body of said first or second unitary clip.

9. The panel assembly of claim 1,
a) wherein two or more said unitary clips are located in pairs on at least one of the perimeter edges of said first panel;
b) wherein two or more said unitary clips are located in pairs on at least one of the perimeter edges of said second panel;
c) wherein each clip-pair is symmetrically located about the midlines of said first panel and said second panel;
d) wherein each said unitary clip of each said symmetrically located clip-pair is oriented opposite to each other;
e) wherein each said unitary clip of each said symmetrically located clip-pair is oriented in the same direction to each other; or
f) a combination thereof.

10. A method of assembling two or more panels together comprising:
a) providing at least two panel assemblies of claim 1;
b) operably engaging said at least one first unitary clip of said first panel assembly to said at least one second unitary clip of said second panel assembly;
c) wherein said at least one first unitary clip of said first panel assembly and said at least one second unitary clip of said second panel assembly can operably engage with each other by way of:
  i) said protruding load bearing interface operably engaging said recessive load bearing interface;

ii) said first securing mechanism operably engaging said second complimentary securing mechanism; or iii) a combination thereof; and d) further wherein said first panel assembly and said second panel assembly are assembled by way of said at least one first unitary clip of said first panel assembly operably engaged with said at least one second unitary clip of said second panel assembly.

11. The method of claim 10,
wherein said first securing mechanism comprises a single extended T-shaped beam, and said second complimentary securing mechanism comprises two or more parallel beams that extend from said clip body to operably engage said T-shaped beam from a separate unitary clip body.

12. The method of claim 10,
wherein said first securing mechanism comprises a catch or a pin, and said second complimentary securing mechanism comprises a moveable latch or a lever to operably engage said catch or a pin from a separate unitary clip body.

13. The method of claim 10,
wherein said first securing mechanism comprises a screw, a bolt, or a cam-style fastener; and said second complimentary securing mechanism comprises threads or a cam-lock to operably engage said screw, bolt, or cam-style fastener from a separate unitary clip body.

14. The method of claim 10,
wherein said at least one first panel assembly, said at least one second panel assembly, or a combination thereof comprise wood, cardboard, composite, plastic, or a combination thereof; and comprise walls, trusses, ceilings, floors, or other structural or nonstructural element of a building, house, room, storage building, or other type of shelter, or a combination thereof.

15. The method of claim 10,
wherein said at least one first panel assembly, said at least one second panel assembly, or a combination thereof comprise wood, cardboard, composite, plastic, or a combination thereof; and comprise supports, walls, ceilings, floors, shelves, or other structural or non-structural elements to construct pet furniture.

16. The method of claim 10,
wherein said at least one first panel assembly, said at least one second panel assembly, or a combination thereof comprise wood, cardboard, composite, plastic, or a combination thereof; and comprise panels, shelves, sides, tops, bottoms, table tops, or other structural or non-structural elements to construct home furniture, cabinets, shelving, closet storage, desks, tables, dressers, or combination thereof.

17. The method of claim 10,
wherein said at least one first panel assembly, said at least one second panel assembly, or a combination thereof comprise wood, cardboard, composite, plastic, or a combination thereof; and comprise dividers, shelves, walls, table tops, or panels to construct trade show booths.

18. The method of claim 10,
wherein said at least one first panel assembly, said at least one second panel assembly, or a combination thereof comprise wood, cardboard, composite, plastic, or a combination thereof; and comprise supports, railings, or panels, or other structural or non-structural elements to construct solar panel support structures, trusses, or scaffolding.

19. The method of claim 10,
wherein said at least one first panel assembly, said at least one second panel assembly, or a combination thereof comprise wood, cardboard, metal, composite, plastic, or a combination thereof; and comprise supports, walls, ceilings, floors, platforms, slides, or other structural or non-structural elements to construct children's playground or jungle gym structures.

20. The method of claim 10,
wherein said at least one first panel assembly, said at least one second panel assembly, or a combination thereof comprise a children's toy construction set.

\* \* \* \* \*